United States Patent [19]

Asakawa et al.

[11] Patent Number: 5,062,043

[45] Date of Patent: Oct. 29, 1991

[54] INFORMATION COLLECTING AND DISTRIBUTING SYSTEM PROVIDING PLURAL SOURCES AND DESTINATIONS WITH SYNCHRONOUS ALTERNATING ACCESS TO COMMON STORAGE

[75] Inventors: Shunju Asakawa, Kawasaki; Yoshiakira Akimoto, Yokohama; Takashi Abe, Sano, all of Japan

[73] Assignee: The Tokyo Electric Power Co., Inc., Tokyo, Japan

[21] Appl. No.: 133,298

[22] Filed: Dec. 15, 1987

[30] Foreign Application Priority Data

Dec. 16, 1986 [JP] Japan ............................... 61-299179
Nov. 27, 1987 [JP] Japan ............................... 62-299035

[51] Int. Cl.$^5$ ..................... G06F 13/38; G06F 13/22; G06F 1/04
[52] U.S. Cl. .................................. 364/200; 364/920; 364/239.5; 364/238.4; 364/245.5; 364/245.6; 364/246; 364/246.1; 364/246.11; 364/260; 364/260.3; 364/282.1; 364/939.1; 364/940; 364/940.61; 364/940.68; 364/948.3; 364/964; 364/964.6; 364/270; 364/271
[58] Field of Search ... 364/200 MS File, 900 MS File; 365/189

[56] References Cited

U.S. PATENT DOCUMENTS

| | | | |
|---|---|---|---|
| 3,889,064 | 6/1975 | Fletcher | 370/85.9 |
| 4,056,851 | 11/1977 | Hovagimyan | 364/900 |
| 4,138,730 | 2/1979 | Ali | 364/726 |
| 4,161,651 | 7/1979 | Sano | 455/603 |
| 4,410,942 | 10/1983 | Milligan | 364/200 |
| 4,423,482 | 12/1983 | Hargrove | 364/200 |
| 4,445,176 | 4/1984 | Burk et al. | 364/200 |
| 4,445,204 | 4/1984 | Nishiguchi | 365/194 |
| 4,471,435 | 9/1984 | Meisner | 364/422 |
| 4,568,934 | 2/1986 | Allgood | 364/464.04 |
| 4,604,686 | 8/1986 | Reiter et al. | 364/200 |
| 4,611,298 | 9/1986 | Schuldt | 364/900 |
| 4,614,841 | 9/1986 | Babecki et al. | 179/18 ES |
| 4,630,196 | 12/1986 | Bednar, Jr. et al. | 364/200 |
| 4,686,474 | 8/1987 | Olsen | 358/109 |
| 4,783,748 | 11/1988 | Swartztrauber | 364/492 |
| 4,789,960 | 12/1988 | Willis | 364/900 |
| 4,811,249 | 3/1989 | Marsh | 364/900 |
| 4,831,582 | 5/1989 | Miller | 364/900 |
| 4,847,757 | 7/1989 | Smith | 364/200 |
| 4,905,205 | 2/1990 | Rialan | 340/870.28 |

FOREIGN PATENT DOCUMENTS 62-101148 5/1987 Japan.
63-104193 5/1988 Japan.

OTHER PUBLICATIONS

"Computer Links in EMS Replace RTUs"; Electrical World, Jun. 1986, pp. 74 and 75.
A Japanese Document and Translation Entitled: "Discussion About Telemeter Telecommand Switching System"; from the 34th Information Processing Society (First Term in 1987); General Assembly.
D. B. Anderson et al.–"Design Aspects of the Ontario Hydro DACS Project Data Acquisition Subsystem".
J. F. Dopaza et al.–"The New AEP System Control Center", E. Eakely et al.–Computer Links in EMS Replace RTUs.

*Primary Examiner*—Thomas C. Lee
*Assistant Examiner*—Eric Coleman
*Attorney, Agent, or Firm*—Burns, Doane, Swecker & Mathis

[57] ABSTRACT

A system for collecting information from information sources and distributing the collected information to destinations, where such information is required, writes the information collected from the sources into respective addresses of a storage by use of respective write-in devices each of which is connected directly to the respective source through a transmission route. The system reads any required information out of the storage through retrieval by use of respective read-out devices each of which is connected directly to the respective destination through a transmission route in order to distribute the read-out information to the destination. The write-in and read-out devices are connected to the storage one after another repeatedly, at a time decided by a timing device.

2 Claims, 3 Drawing Sheets

INFORMATION COLLECTING AND DISTRIBUTING SYSTEM PROVIDING PLURAL SOURCES AND DESTINATIONS WITH SYNCHRONOUS ALTERNATING ACCESS TO COMMON STORAGE

FIELD OF THE INVENTION

This invention relates to a system for collecting and distributing informations to be applied to any data processing systems equipped with plural computers, and in particular such systems for collecting and distributing informations in which some informations required by at least one information processing device (e.g. a computer) are selected out of the informations which have been collected from at least one information source by use of at least one information collecting device (e.g. a computer), and such selected informations are distributed in a proper format to the processing device(s) speedily.

DESCRIPTION OF THE PRIOR ART

In a system of the kind herein referred, "m" information processing devices (i.e. computers) are directly linked through "m×n" transmission routes with "n" information collecting devices (i.e. computers) so that data-informations e.g. the voltage collected by use of an information detecting device such as a volt-meter attached to the collecting devices can be distributed simultaneously and in parallel to the processing devices.

As a consequence, in such a conventional system, the informations can be collected and distributed at the same time and in parallel without a traffic jam on the routes and no address message is required so that the design and maintenance of the system is facilitated. However there is a demerit of inviting a multiplication of the routes (i.e. "m×n" routes) (given m=20 and n=100, then m×n=2,000) which results in a heavy installation cost in case that the collecting devices and processing devices should be remotely located with respect to one another.

Another system which could be constructed on the analogy of the telephone system well-known to any person skilled in the art in order to reduce the installation cost relative to the first system has a set of "s" exchangers each of which covers one unit block so that "n" information collecting devices (i.e. computers) are arranged in a proper way to the exchangers, as well as another set of "t" exchangers all of which on the one hand are linked through common traffic routes to the former exchangers and on the other hand are linked to "m" information processing devices (i.e. computers) as arranged to the latter ones in a proper way. In such a system the detected data at the information detecting devices such as a volt-meter, are collected and sorted into packets of a proper size by the collecting devices, such packets of informations being provided with the informations regarding both the address of the collecting devices which shows the origin of such informations and that of the processing devices which represents the destination of the informations, thus becoming 'information-packet signals' which are conveyed to the former ones so as to be transmitted via common traffic routes therefrom. And the latter ones distribute the information-packet signals received via common traffic routes to the processing devices via other traffic routes according to the address information contained in such signals.

In this system the total number of traffic routes is reduced relative to the first described system by using the traffic routes in common, thus serving for an economy of the installation costs which are the fault of the first conventional system above-mentioned, but the requirement of the address information for each information-packet signal means a demerit that the design and maintenance of the system turn out to be a difficult and intricated job. Furthermore, another fault of this second conventional system which allows one to keep a constant balance in the flux of the information-packet signals when it is applied for a general small or medium scale system, lies in an eventual risk that when it is adopted in a large scale system such as a monitored control system for an electric power supply system, should there occur an interruption of the electricity service, a traffic jam may render it impossible to take the necessary steps as the situation demands, since a great number of detecting devices start to function all at once which will cause a rush of too many information-packet signals to the exchangers beyond their capacity.

SUMMARY OF THE INVENTION

It is accordingly an object of the present invention to provide an information collecting and distributing system which dispenses with packet signals at the time of collecting and distributing informations.

Another object of this invention is to provide an information collecting and distributing system which reduces to a great extent an address control job in information processing and facilitates its design and maintenances.

A further object of this invention is to provide an information collecting and distributing system by which excessive concentration of the informations can be avoided through their parallel collection and distribution of the informations, thus the collection and distribution of the informations can be prevented from being jammed and delayed, and the informations can be collected and distributed essentially on real time.

Yet another object of this invention is to provide an information collecting and distributing system wherein the total number of the traffic routes are not greater than "m+n", which is a sum total of "m" and "n", wherein "m" represents the number of information write-in devices and "n" representing that of the information read-out devices.

A still further object of this invention is to provide an information collecting and distributing system which can take the necessary steps promptly for emergencies in case that the system is applied into a distributed control system such as a monitored control system for electric power supply systems in a determined area or the similar system for buildings within a local area.

Other and further objects, features and advantages of this invention will become apparent fully during the following discussion of the accompanying drawings, wherein.

Figure 1:
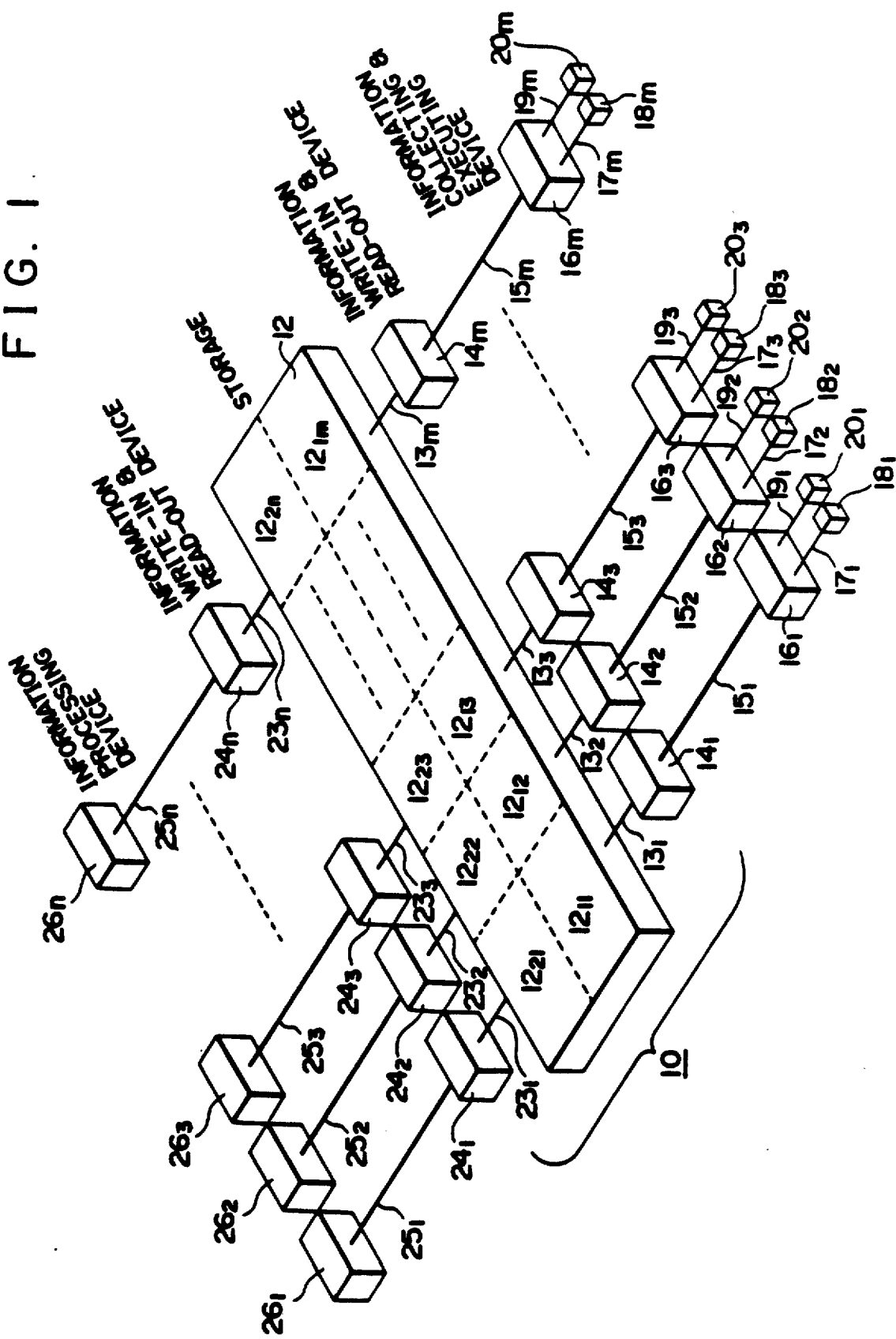
FIG. 1 is a schematic diagram of a system embodying the present invention.

DESCRIPTION OF THE PREFERRED EMBODIMENT 10 shows an information collecting and distributing system of the present invention. The system 10 comprises a storage 12 containing storage areas $12_{11}, 12_{12}, 12_{13}, \ldots, 12_{1m}$ and $12_{21}, 12_{22}, 12_{23}, \ldots, 12_{2n}$; at least one information write-in and read-out device $14_1, 14_2, 14_3, \ldots, 14_m$ linked to the storage 12 through transmission lines $13_1, 13_2, 13_3, \ldots, 13_m$, respectively; and at least one other information write-in and read-out device $24_1, 24_2, 24_3, \ldots, 24_n$ linked to the storage 12 through other transmission lines $23_1, 23_2, 23_3, \ldots, 23_n$, respectively (both m and n denote any given natural numbers). The storage 12 may be composed of those devices (for example IC memories) having an appropriate size and rates of write-in and read-out. The devices $14_1, 14_2, 14_3, \ldots, 14_m$ and $24_1, 24_2, 24_3, \ldots, 24_n$ may be formed with any computer of an appropriate size and working area such as a micro-computer.

Information collecting and executing devices $16_1, 16_2, 16_3, \ldots, 16_m$ serve as information sources corresponding to the storage areas $12_{11}, 12_{12}, 12_{13}, \ldots, 12_{1m}$ of the storage 12 and as information destinations described below. The devices $16_1, 16_2, 16_3, \ldots, 16_m$, which may be formed with any computer of an appropriate size and working area such as a micro-computer, are connected to the devices $14_1, 14_2, 14_3, \ldots, 14_m$ through transmission routes $15_1, 15_2, 15_3, \ldots, 15_m$, respectively.

Information detecting devices $18_1, 18_2, 18_3, \ldots, 18_m$, each of which serves for a real information source, and may be formed with, for example, means for detecting ON/OFF of a switch in a power plant are connected to the devices $16_1, 16_2, 16_3, \ldots, 16_m$ through transmission lines $17_1, 17_2, 17_3, \ldots, 17_m$, respectively. One of the devices $18_1, 18_2, 18_3, \ldots, 18_m$ is arranged to one of the devices $16_1, 16_2, 16_3, \ldots, 16_m$, respectively, for keeping simplicity in the description and drawings, though the number of the devices $18_1, 18_2, 18_3, \ldots, 18_m$ arranged to each of the devices $16_1, 16_2, 16_3, \ldots, 16_m$ is not limited to one. In case that plural detecting device are arranged to each device $16_1, 16_2, 16_3, \ldots, 16_m$, respectively, or the task of detecting different sorts of informations is carried out by each of the devices $18_1, 18_2, 18_3, \ldots, 18_m$, each of the storage areas $12_{11}, 12_{12}, 12_{13}, \ldots, 12_{1m}$ may be segmented into plural areas.

Information executing devices $20_1, 20_2, 20_3, \ldots, 20_n$, each of which serves for a real information destination and may be formed with, for example, means for switching an electrical contact in a power plant, are connected to the devices $16_1, 16_2, 16_3, \ldots, 16_m$ through transmission lines $19_1, 19_2, 19_3, \ldots, 19_m$, respectively. One of the devices $20_1, 20_2, 20_3, \ldots, 20_m$ is arranged to one of the devices $16_1, 16_2, 16_3, \ldots, 16_m$, respectively, for keeping simplicity in the description and drawings, though the number of the devices $20_1, 20_2, 20_3, \ldots, 20_m$ arranged to each of the devices $16_1, 16_2, 16_3, \ldots, 16_m$ is not limited to one.

Information processing devices $26_1, 26_2, 26_3, \ldots, 26_n$ serve for an information destination and also an information source corresponding to the storage areas $12_{21}, 12_{22}, 12_{23}, \ldots, 12_{2n}$ in the storage 12, respectively. The devices $26_1, 26_2, 26_3, \ldots, 26_n$, which may be formed with any computer of an appropriate size and working area such as a medium computer are connected to the devices $24_1, 24_2, 24_3, \ldots, 24_n$ through transmission routes $25_1, 25_2, 25_3, \ldots, 25_n$, respectively.

Now the operational function of the system 10 will be described in detail hereinafter.

Firstly, let it be explained in what a manner the informations shall be written into the storage areas $12_{11}, 12_{12}, 12_{13}, \ldots, 12_{1m}$ of the storage 12, starting from the information sources, that is, the information collecting and executing devices $16_1, \ldots, 16_m$:

Each of the devices $16_1, \ldots, 16_m$ collects the data as informations cyclically, for example at regular intervals if needed, from the detecting devices $18_1, \ldots, 18_m$ through the transmission lines $17_1, \ldots, 17_m$, respectively, and forwarding also cyclically, for example at regular intervals if needed, those collected data-informations to the corresponding information write-in and read-out devices $14_1, \ldots, 14_m$ through the transmission routes $15_1, \ldots, 15_m$, respectively. Then, the devices $14_1, \ldots, 14_m$ write and store those data-informations forwarded from the corresponding information sources i.e. devices $16_1, \ldots, 16_m$ through the transmission lines $13_1, \ldots, 13_m$, into the respective storage areas $12_{11}, 12_{12}, 12_{13}, \ldots, 12_{1m}$ of the storage 12 which have been allocated against the information sources. The data-informations stored at the storage areas $12_{11}, \ldots, 12_{1m}$ are renewed cyclically, for example at regular intervals if needed.

Secondly, let it be explained in what a manner the informations shall be read out of the storage 12 and delivered to the information processing devices $26_1, \ldots, 26_n$ that stand for their destinations:

The information write-in and read-out devices $24_1, \ldots, 24_n$ retrieve, read out and edit the required data-informations from the storage areas $12_{11}, 12_{12}, 12_{13}, \ldots, 12_{1m}$ of the storage 12 and transfer the edited data-informations through trasmission routes $25_1, \ldots, 25_n$ to the corresponding devices $26_1, \ldots, 26_n$, respectively. Each of the devices $26_1, \ldots, 26_n$ processes, following the built-in program it has, those data-informations which have been collected by the devices $16_1, \ldots, 16_m$ and then delivered through the intermediary of the storage 12, so that the instruction messages are produced for not only all devices $26_1, \ldots, 26_n$ except itself but also the devices $16_1, \ldots, 16_m$.

Thirdly, the explanation continues hereunder regarding the manner by which the informations shall be written into the storage areas $12_{21}, 12_{22}, 12_{23}, \ldots, 12_{2n}$ of the storage 12, starting from those information sources, that is, the information processing devices $26_1, \ldots, 26_n$:

The devices $26_1, \ldots, 26_n$ transmit through the transmission routes $25_1, \ldots, 25_n$ those instruction-messages as message-informations cyclically for example at regular intervals if needed, towards the devices $24_1, \ldots, 24_n$. These devices $24_1, \ldots, 24_n$ write such informations from the devices $26_1, \ldots, 26_n$ into the respective storage areas $12_{21}, 12_{22}, 12_{23}, \ldots, 12_{2n}$ of the storage 12 which have been allocated against the information source of such message-informations. And the message-informations stored at the storage areas $12_{21}, \ldots, 12_{2n}$ are renewed cyclically, for example at regular intervals if needed.

Fourthly, the following explanation relates to how the message-informations stored in the storage 12 being read out for the other information processing devices, which are the information destinations, out of the information processing devices $26_1, \ldots, 26_n$, which serve as the information sources, and the information collecting and executing devices $16_1, \ldots, 16_m$, which are also the information destinations:

The devices $14_1, \ldots, 14_m$ retrieve cyclically, for example at regular intervals if needed, the storage areas $12_{21}, 12_{22}, 12_{23}, \ldots, 12_{2n}$ of the storage 12 by way of the transmission lines $13_1, \ldots, 13_m$, read out the desired message-informations i.e. those message-informations which are addressed towards the devices $16_1, \ldots, 16_m$, and then edit those messages. The edited message-informations are transmitted via the transmission routes $15_1, \ldots, 15_m$ to the devices $16_1, \ldots, 16_m$.

The devices $16_1, \ldots, 16_m$ put the information executing devices $20_1, \ldots, 20_m$ into action in a proper manner according to the message-informations transmitted from the devices $26_1, \ldots, 26_n$ through the intermediary of the storage 12.

Thus, the data-informations detected by the devices $18_1, \ldots, 18_m$ will vary with time so that the data-informations and message-informations stored in the storage 12 will be renewed in the above-mentioned manner during the following operational cycle.

The devices $24_1, \ldots, 24_n$ retrieve cyclically, for example at regular intervals if needed, the storage areas $12_{21}, 12_{22}, 12_{23}, \ldots, 12_{2n}$ of the storage 12 by way of the transmission lines $23_1, \ldots, 23_n$, read out the desired message-informations i.e. those message-informations which are addressed towards the other information processing devices, which are the information destinations, out of the information processing devices $26_1, \ldots, 26_n$, which serve as the information souces, and then edit those message-informations. The edited message-informations are transmitted via the transmission routes $25_1, \ldots, 25_n$ to the above-mentioned other information processing devices.

The other information processing devices, to which the message-informations are distributed through the storage 12 from the information processing devices $26_1, \ldots, 26_n$, modify the processing along the built-in program in accordance with the distributed message-informations. Then the cycle of the collecting and distributing informations described in the above may be repeated also at the other information processing devices.

Figure 2:
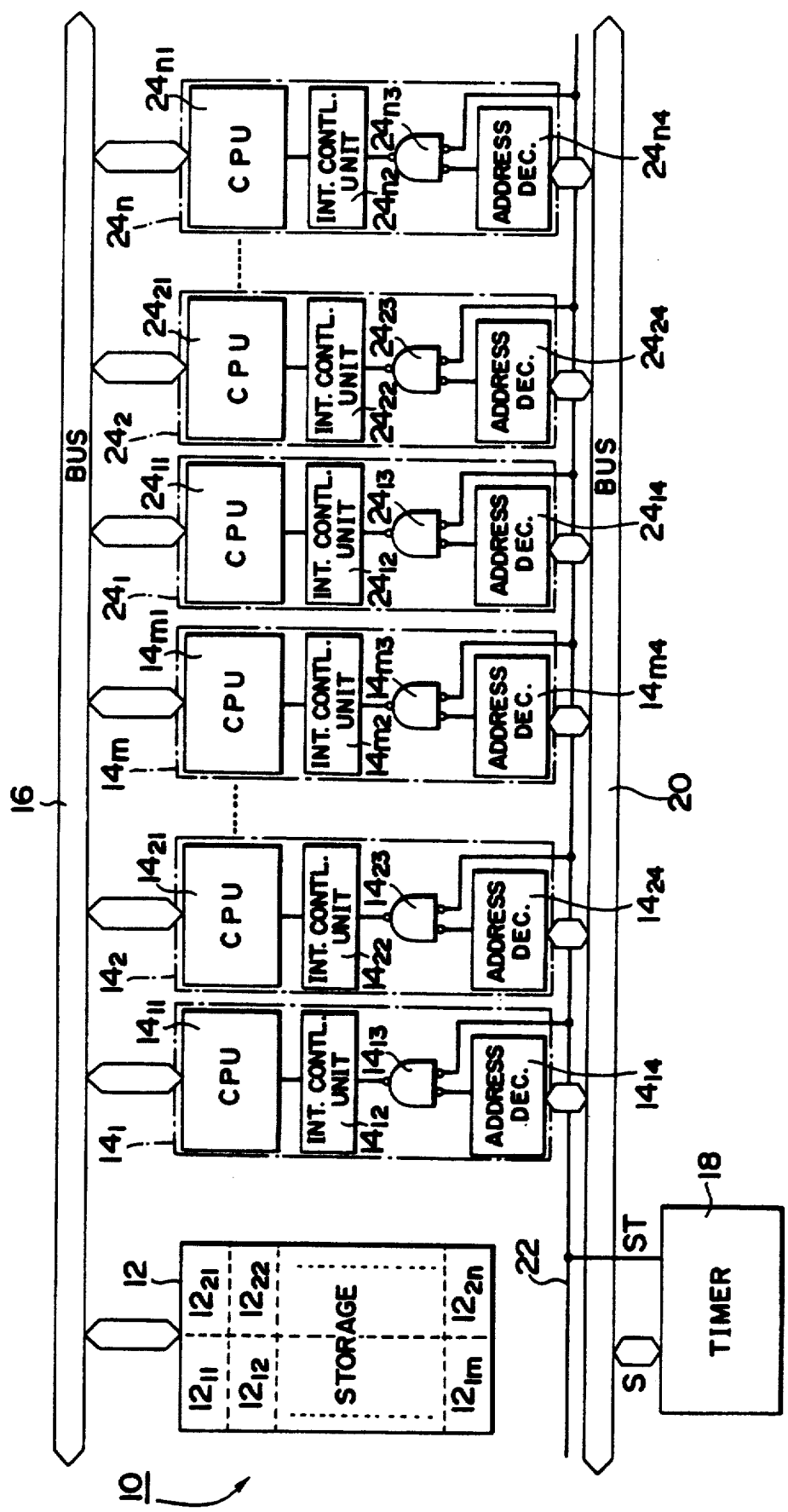
FIG. 2 is a block diagram of a part of the system shown in FIG. 1.
Figure 3:
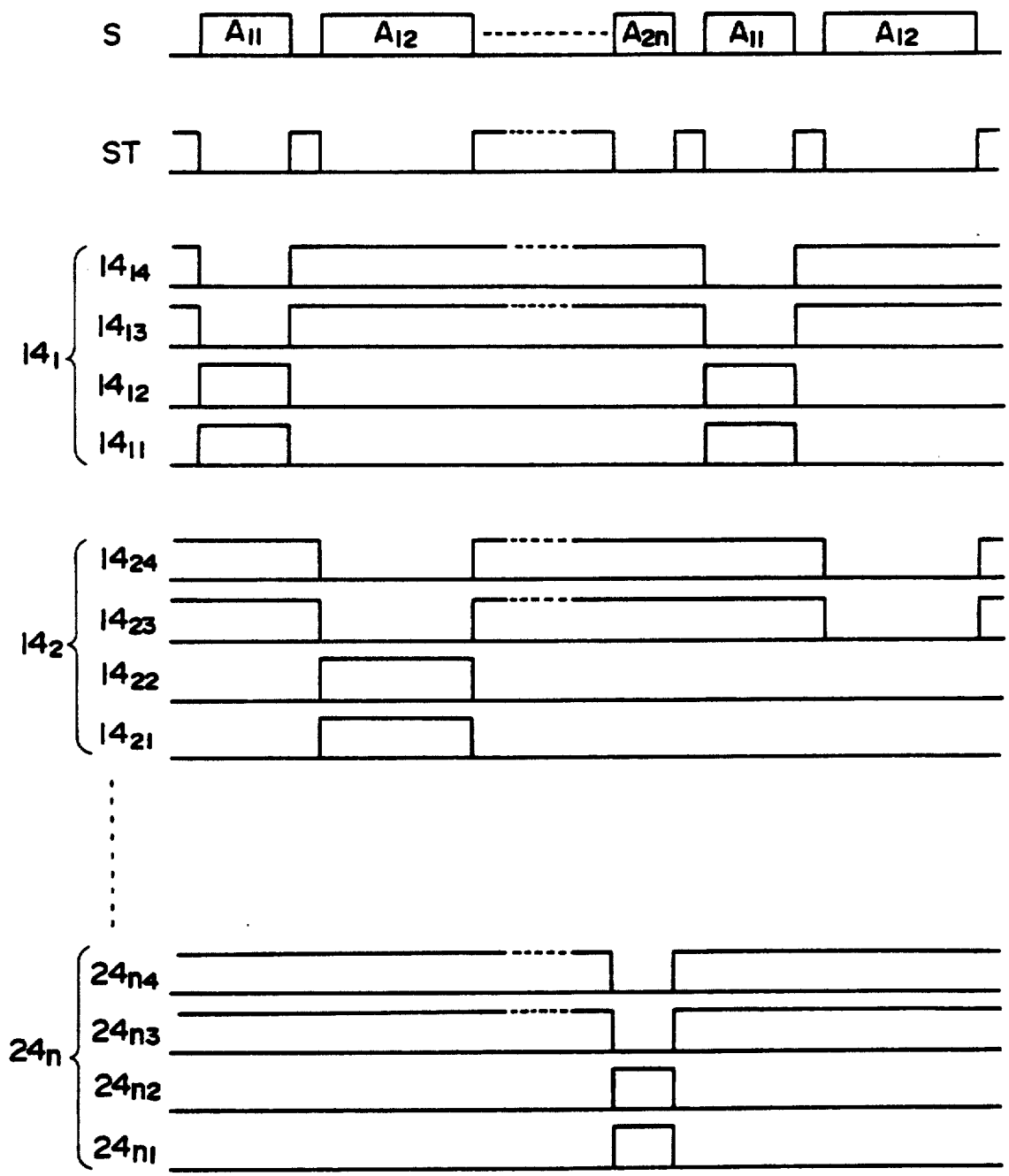
FIG. 3 is a time chart for showing the operation of the part shown in FIG. 2.

Further the operational function and further detail structure of the information write-in and read-out of the storage 12 will be described more in detail on the system 10 (especially see FIGS. 2 and 3).

When an address signal S produced by a timer 18 to the bus 20 becomes the address "$A_{11}$", (for example "001" in the binary notation), of the devices $14_1$, a strobe signal ST produced by the timer 18 to the bus 20 changes from high level i.e. "1" to low level i.e. "0".

Thus the device $14_1$ works as follows:

The address signal S is in accord with the address "$A_{11}$" of the device $14_1$ so that the output of the address decoder $14_{14}$ changes from high level i.e. "1" to low level i.e. "0". The output of the inverted NAND $14_{13}$ changes from high level i.e. "1" to low level i.e. "0".

Accordingly, an interruption signal is given from the interruption controller unit $14_{12}$ to CPU $14_{11}$ so that CPU $14_{11}$ is connected to the storage 12 via a bus 16 which corresponds to the transmission line $13_1, \ldots, 13_m$; $23_1, \ldots, 23_n$. CPU $14_{11}$ writes the new data-information into the storage area $12_{11}$ of the storage 12 in order to renew the data-information stored in the storage area $12_{11}$, and retrieves and reads out the message-informations, which are needed by itself, from the storage areas $12_{21}, 12_{22}, \ldots, 12_{2n}$ of the storage 12.

And the devices $14_2, \ldots, 14_m$ and $24_1, \ldots, 24_n$ work as follows:

The address signal S is not in accord with the addresses "$A_{12}$",$\ldots$,"$A_{1m}$", and "$A_{21}$",$\ldots$,"$A_{2n}$" of the devices $14_2, \ldots, 14_m$ and $24_1, \ldots, 24_n$, respectively, so that the outputs of the address decoders $14_{24}, \ldots, 14_{m4}$ and $24_{14}, \ldots, 24_{n4}$ are kept to high level i.e. "1". The outputs of the inverted NAND $14_{23}, \ldots, 14_{m3}$ and $24_{13}, \ldots, 24_{n3}$ are also kept to high level i.e. "1", though the strobe signal ST changes from high level i.e. "1" to low level i.e. "0". The interruption signal is not given from the interruption controller units $14_{22}, \ldots, 14_{m2}$ and $24_{12}, \ldots, 24_{n2}$ to CPU $14_{21}, \ldots, 14_{m1}$ and $24_{11}, \ldots, 24_{n1}$, respectively, so that CPU $14_{21}, \ldots, 14_{m1}$ and $24_{11}, \ldots, 24_{n1}$, are not connected to the bus 16. Thus the devices $14_2, \ldots, 14_m$ and $24_1, \ldots, 24_n$ carry out their own processing operations, respectively.

When the term allotted to the device $14_1$ expires, the address signal S produced from the timer 18 is removed i.e. changed from the address "$A_{11}$" of the device $14_1$ to "0" (e.g. "000" in the binary notation), and the strobe signal ST is changed from low level i.e. "0" to high level i.e. "1".

Thus the device $14_1$ works as follows:

The address signal S is not in accord with the address "$A_{11}$" of the device $14_1$ so that the output of the address decoder $14_{14}$ changes from low level i.e. "0" to high level i.e. "1". The output of the inverted NAND $14_{13}$ changes from low level i.e. "0" to high level i.e. "1".

Accordingly the interruption signal given from the interruption controller unit $14_{12}$ to CPU $14_{11}$ is removed so that the connection of CPU $14_{11}$ to the bus 16 is interrupted. The device $14_1$ is disconnected from the storage 12 and returns to carry out its own operations for processing informations, for example receiving the data-informations from the device $16_1$ or forwarding the message-informations to the device $16_1$.

And the devices $14_2, \ldots, 14_m$ and $24_1, \ldots, 24_n$ work as follows:

The address signal S becomes "0" (e.g. "000" in the binary notation) and is not in accord with the addresses "$A_{12}$",$\ldots$,"$A_{1m}$", and "$A_{21}$",$\ldots$,"$A_{2n}$" of the devices $14_2, \ldots, 14_m$ and $24_1, \ldots, 24_n$, respectively, yet, so that the outputs of the address decoder $14_{24}, \ldots, 14_{m4}$ and $24_{14}, \ldots, 24_{n4}$ are kept to high level i.e. "1". The outputs of the inverted NAND $14_{23}, \ldots, 14_{m3}$ and $24_{13}, \ldots, 24_{n3}$ are kept to high level i.e. "1", though the strobe signal ST changes from low level i.e. "0" to high level i.e. "1". The interruption signal is not given from the interruption controller units $14_{22}, \ldots, 14_{m2}$ and $24_{12}, \ldots, 24_{n2}$ to CPU $14_{21}, \ldots, 14_{m1}$ and $24_{11}, \ldots, 24_{n1}$, respectively, so that CPU $14_{21}, \ldots, 14_{m1}$ and $24_{11}, \ldots, 24_{n1}$, are not connected to the bus 16. Thus the devices $14_2, \ldots, 14_m$ and $24_1, \ldots, 24_n$ continue to carry out their own operations for processing informations as described in the above.

When the terms, which are allotted to the devices $14_2, \ldots, 14_m$ and $24_1, \ldots, 24_n$, respectively, come, the address signal S produced by the timer 18 to the bus 20 changes to the addresses "$A_{12}$",$\ldots$,"$A_{1m}$" and "$A_{21}$",$\ldots$, "$A_{2n}$", successively, so that the devices $14_2, \ldots, 14_m$ and $24_1, \ldots, 24_n$ work in the same manner as the device $14_1$ mentioned in the above.

When the connection between the device $24_n$ and the storage 12 is finished, one of the connection cycles between the devices $14_1, \ldots, 14_m$ and $24_1, \ldots, 24_n$ and the storage 12 is accomplished and the new connection cycle starts.

In the above, the respective terms allotted to the devices $14_1, \ldots, 14_m$ and $24_1, \ldots, 24_n$ may be constant between the connection cycles, and also changeable between the connection cycles. In other words, the connection of the devices $14_1, \ldots, 14_m$ and $24_1, \ldots, 24_n$ to the storage 12 by the timer 18 may be cyclic and further may be desirable, especially at regular intervals.

For the sake of simplicity, the above explanation does not refer to a distribution of the message-informations from any certain device out of the information collecting and executing devices $16_1, \ldots, 16_m$ either towards the other devices belonging to the same devices $16_1, \ldots, 16_m$ or towards the information processing devices $26_1, \ldots, 26_n$, nor refer to a distribution of the data-informations from any certain device out of the information collecting and executing devices $16_1, \ldots, 16_m$ towards the other information collecting and executing devices belonging to the same devices $16_1, \ldots, 16_m$. However, distribution of such informations between the above-mentioned devices in the above manner may be available and realized if needed.

Similarly, the present system may be arranged in a way that the information write-in and read-out devices $14_1, \ldots, 14_m$ may have only to write the informations in, that is, the devices in question may do the functions merely as an information write-in device. Accordingly, the information collecting and executing devices $16_1, \ldots, 16_m$ may dispense with the information executing devices $20_1, \ldots, 20_m$, so that these devices may have only to control over the collection of the informations. Thus, they may have only the functions of an information collecting device or simply of an information source. In consequence, the functions of the information write-in and read-out devices $14_1, \ldots, 14_m$ may be confined to such ones that an information write-in device should fulfil; that is to say, the functions of collecting the informations from the information sources and writing those informations into the storage 12.

Moreover, the system may be modified in a way that the information write-in and read-out devices $24_1, \ldots, 24_n$ may be engaged in merely reading out the informations without writing in; that is, the devices may do only the functions of information read-out devices. Accordingly, the system may be composed so that the information processing devices $26_1, \ldots, 26_n$ used in it may fulfil merely the functions of processing the informations passively. In consequence, the system may be arranged so that the information write-in devices $24_1, \ldots, 24_n$ may play a role simply as an information read-out device which is to read out the informations from the storage 12 and to deliver those informations to the site where they are required.

The present description and the accompanying drawings refer only to the system wherein a single storage 12 is made use of. However, the present invention is not limited to such system, but includes, as defined by the scope of the accompanying claims, the system in which a plural number of the storages 12 are employed along with information transmission devices that are arranged between the plural storages and connected with each other so that the informations may be transferred from a storage 12 to other storage(s) and vice versa.

All the above is an explanation regarding a system embodying the invention. However it is to be noted that the invention should not be confined to such a system but that it should comprise any and every modification of the system architecture, all modified examples for practice of the system and any substitution by the equivalents in and of the system.

What is claimed is:

1. A system for collecting information from a set number of sources and distributing the collected information to a set number of destinations where such information is required, and for collecting reply-information from the destinations and distributing the collected reply-information to the sources comprising:
   (a) a common storage having areas whose addresses are allocated to each of the sources and destinations;
   (b) first plurality of write-in and read-out devices, each of which is directly connected to a respective source through a respective transmission route, for collecting information from the respective source, writing the collected information into a respective area of the common storage, reading out required reply-information from among reply-information written into the common storage and delivering the read-out reply-information to the respective source;
   (c) second plurality of write-in and read-out devices, each of which is directly connected to a respective destination through a respective transmission route, for collecting reply-information from the respective destination, writing the collected reply-information into a respective area of said common storage, reading out required information from among the information written in the common storage and delivering the read-out information to the respective destination; and
   (d) a timing device connected to the first and second write-in and read-out devices for connecting each of the first and second write-in and read-out devices to the common storage one after another repeatedly at regular intervals allotted to each of the sources and destinations so that only one of the first and second write-in and read-out devices is connected to the common storage at a time.

2. A system according to claim 1, wherein each of the first and second write-in and read-out devices further comprises:
   (a) a first means for decoding an address signal given by the timing device;
   (b) a gate for receiving an output signal of the first means and a strobe signal from the timing device, said gate sending out an output signal which becomes high level when both the output signal of the first means and the strobe signal become low level;
   (c) a second means connected to the gate for generating an interruption signal when the output signal of the gate becomes high level; and,
   (d) a central processing unit directly connected to both the second means and a respective source or destination through a transmission route, an output or input terminal of which is connected to address a storage area when the interruption signal is received from the second means in order to write the information or reply-information in the storage or read the information or reply-information out of the storage.

* * * * *